United States Patent

Kurosawa et al.

[11] Patent Number: 5,515,124
[45] Date of Patent: May 7, 1996

[54] IMAGE FORMAT ALTERING CAMERA

[75] Inventors: Yuichi Kurosawa; Hideyuki Irie, both of Tokyo, Japan

[73] Assignee: Asahi Kogaku Kogyo Kabushiki Kaisha, Tokyo, Japan

[21] Appl. No.: 267,243

[22] Filed: Jun. 29, 1994

[30] Foreign Application Priority Data

Jun. 29, 1993 [JP] Japan .................................. 5-158673

[51] Int. Cl.$^6$ .................................. G03B 17/24
[52] U.S. Cl. .................................. 354/106; 354/159
[58] Field of Search .................................. 354/94, 159, 105, 354/106

[56] References Cited

U.S. PATENT DOCUMENTS

| | | | |
|---|---|---|---|
| 4,829,333 | 5/1989 | Inoue et al. | 354/106 |
| 5,003,329 | 3/1991 | Itabashi | 354/106 |
| 5,335,031 | 8/1994 | Ogawa | 354/159 |

FOREIGN PATENT DOCUMENTS

5297447  11/1993  Japan .................................. 354/159

*Primary Examiner*—Howard B. Blankenship
*Attorney, Agent, or Firm*—Greenblum & Bernstein

[57] ABSTRACT

A camera has an image format altering mechanism that includes at least one light buffer blade which is arranged to be inserted into and retracted from an aperture of the camera to thereby determine a picture image area. The camera also includes a camera back hinged to a body of the camera so as to be opened and closed, and an image format selecting member provided on the camera back to move the light buffer blade, the image format selecting member being movable between a position corresponding to a retracted position of the light buffer blade and a position corresponding to an inserted position of the light buffer blade. The camera is also provided with a buffer blade biasing member for biasing the light buffer blade towards one of the retracted position and the inserted position, so that the light buffer blade is located at the retracted position or at the inserted position when the camera back is opened, regardless of the position of the light buffer blade before the camera back is opened. A selecting member biasing member is provided for biasing the image format selecting member towards a linkable position at which the image format selecting member links with the image format altering mechanism, independently of the buffer blade biasing member, so that the image format altering mechanism and the image format selecting member are linked with each other when the camera back is closed.

19 Claims, 7 Drawing Sheets

IMAGE FORMAT ALTERING CAMERA

BACKGROUND OF THE INVENTION

1. Field of the Invention

The present invention relates to a camera having a mechanism for varying between more than one image format (i.e., film image area) on a type of film intended for a single image format.

2. Description of Related Art

In recent years, a camera having a mechanism for selecting large and small image format sizes (e.g., regular 35mm format and panorama format) has been developed. The image format is varied by inserting, for instance, a pair of light buffer blades into upper and lower areas of the picture forming light path.

In this type of camera, it is known for a manual operating member of an image format altering device to be provided on the hinged camera back. However, in conventional cameras, the light intercepting mechanism (e.g., light buffer blades) of the image format altering device is not linked with the manual operating member located on the camera back when the camera back is open. Accordingly, the manual operating member might be inadvertently changed while it is not connected with the light intercepting mechanism. In such a case, when the camera back is closed, the positions of the light intercepting mechanism and the manual operating member might not correspond. In other words, the light intercepting mechanism might be set at the standard position while the manual operating member indicates the panorama mode as being set, or vice versa. Consequently, an incorrect photographing operation would result.

Some of the above-described cameras have imprint modules which imprint photographing data, such as the date of a picture taking operation. Data imprinting cameras having water-resistant capabilities have problems, such as the following, which must be solved.

Imprint modules that are built into the camera back may not be easily electrically connected to the control circuitry built into the water-resistant camera body with a flexible printed cord due to the water-tight camera body construction. A conventional technique applied to solve the above-described problem is to place connecting pins on the inside wall of the camera back to contact the terminals installed in the camera body when the back is closed. The imprint module will thus be electrically connected with the control circuitry of the camera body.

The obvious problems derived from the above-noted conventional art are related to the electrical connections between the date imprint module(s) (built into a camera body for accommodating dual data imprints corresponding to large as well as small image formats), connecting pins and corresponding terminals to satisfy required electric power supply, imprint timing information, image format selecting signals, etc. The additional production cost required by the provision of such redundant connecting members, and the problems associated with the possible misconnection between the camera body and camera back, would result in substantial disadvantages to the producers, and users as well, of such cameras.

SUMMARY OF THE INVENTION

The primary object of the present invention, in view of the above-mentioned circumstances, is to provide an image format altering camera having an image format selecting mechanism (i.e, manual operating member) that is built into the hinged back of the camera, independent of the mechanism for driving a light intercepting mechanism of the camera body when the camera back is opened, and that always matches with the state of the light intercepting mechanism regardless of whether the back is opened or closed. In other words, the object is to provide a camera in which the light intercepting mechanism of the camera body and the image format selecting mechanism of the back are always biased towards corresponding states.

Another object of present invention is to provide a camera that does not require additional electric contacts between the data modules installed on the camera back and the control circuitry built in the camera body for accommodating photographing data imprints (e.g., picture taking date) of both large and small image formats.

According to the present invention, a camera is provided having an image format altering mechanism that includes at least one light buffer blade which is arranged to be inserted into and retracted from an aperture of the camera to thereby determine a picture image area. A large image format and a small image format are selected by retracting and inserting the light buffer blade from and into the aperture, respectively. The camera includes a camera back hinged to a body of the camera so as to be opened and closed and an image format selecting member provided on the camera back to move the light buffer blade. The image format selecting member is movable between a position corresponding to a retracted position of the light buffer blade and a position corresponding to an inserted position of the light buffer blade. There is provided a buffer blade biasing member for biasing the light buffer blade towards one of the retracted position and the inserted position so that the light buffer blade is located at the retracted position or at the inserted position when the camera back is opened, regardless of the position of the light buffer blade before the camera back is opened. A selecting member biasing member is provided for biasing the image format selecting member towards a linkable position at which the image format selecting member links with the image format altering mechanism, independently of the buffer blade biasing member, so that the image format altering mechanism and the image format selecting member are linked with each other when the camera back is closed.

The buffer blade biasing member may bias the buffer blade towards the retracted position. In this arrangement, the selecting member biasing member biases the image format selecting member towards the position corresponding to the retracted position.

According to another aspect of the present invention, a camera is provided having an image format altering mechanism that includes at least one light buffer blade which is arranged to be inserted into and retracted from an aperture of the camera to thereby determine a picture image area. A large image format and a small image format are selected by retracting and inserting the light buffer blade from and into the aperture, respectively. The camera includes a camera back hinged to a body of the camera so as to be opened and closed, and an image format selecting member is provided on the camera back to move the light buffer blade, the image format selecting member being linked with the image format altering mechanism when camera back is closed. A first light emitting mechanism of a first data imprinting device is mounted on the camera back for imprinting photographing related data at a lower portion of the large image area, and a second light emitting device of a second data imprinting device is mounted on the camera back for imprinting photographing related data at a lower portion of the small image area. A selecting switch for selecting one of the first and second light emitting devices in accordance with the image format selected by the image format selecting member is provided.

The image format selecting member and the selecting switch may be comprised of the same member.

It is also possible that the camera of the present invention be constructed to have a water-resistant capability.

The present disclosure relates to subject matter contained in Japanese patent application No. 05-158673 (filed on Jun. 29, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 7:
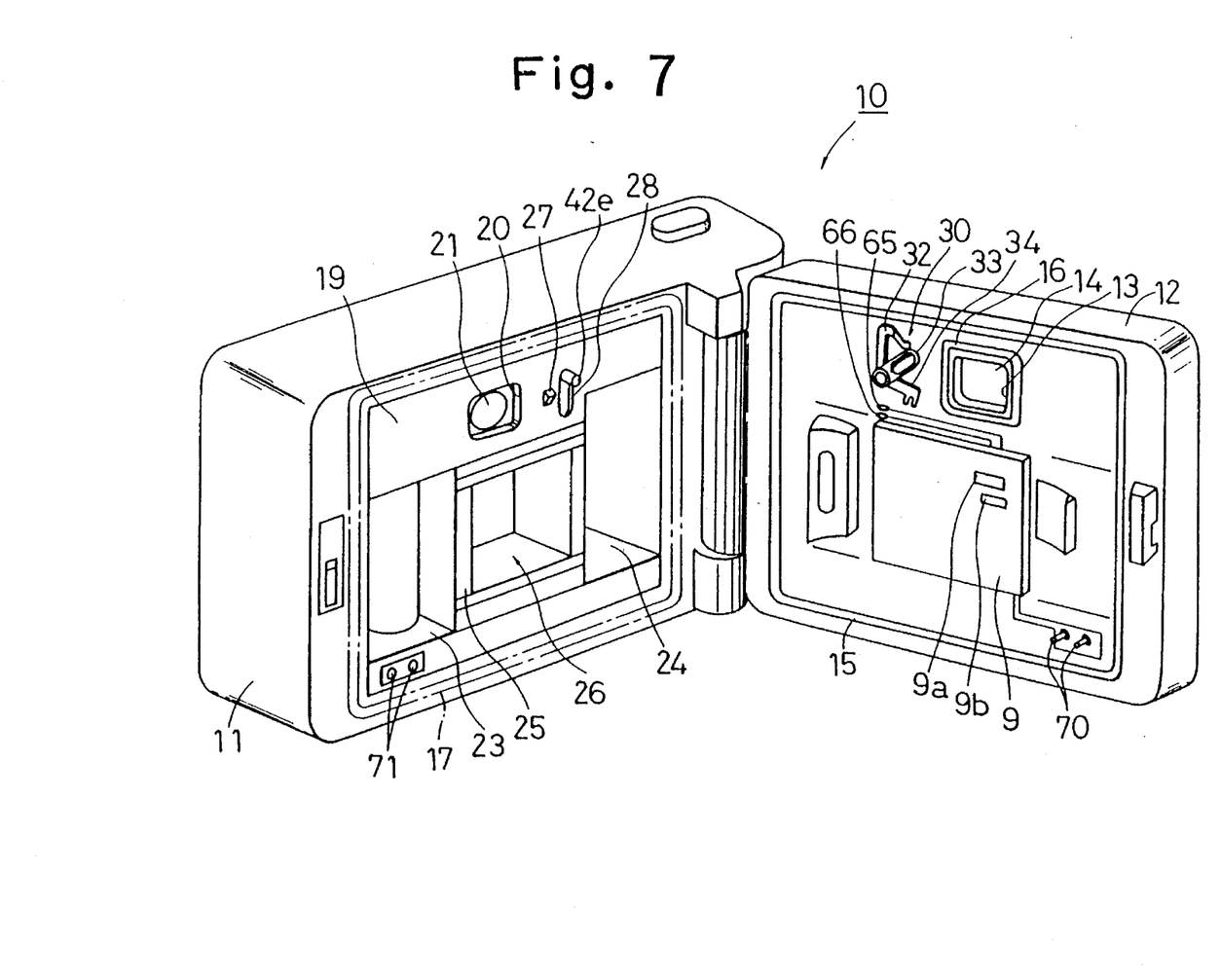

An embodiment of the present invention is described below according to practical, examples. FIG. 7 shows an oblique (i.e., perspective) view of an inside of the camera back 12 of an image format altering camera 10 to which the present invention is applied. The camera body 11 of the image format altering camera 10 is structured to be water resistant. Camera back 12 is hinged on the camera body 11 to be opened and closed. A film pressure plate 9 is provided on the camera back 12.

The water resistant structure of the camera back 12 closed on the camera body 11 is achieved by providing a rubber packing material 15 on the inner circumference of the camera back which is pressed against a packing receptor formed on the camera body 11.

A viewfinder window 13 is formed on the upper part of the camera back 12. The viewfinder window opening is also fitted with a piece of water resistant glass 14 and a packing material (not shown) in a water-tight arrangement. An internal wall 19 located on the back of the camera body 11 is provided with an opening 20. A finder eyepiece lens 21 is mounted inside the opening 20. The water resistant glass 14 is positioned in a manner such that it can be viewed through into the finder eyepiece when the camera back 12 is closed.

A light intercepting packing 16 made of an opaque material is fixed to a peripheral area of the viewfinder window 13 of the inside wall of the camera back 12. The light intercepting packing 16 is pressed against the internal camera wall 19 at a peripheral area of the opening 20 when the camera back is closed. The packing 16 prevents light from leaking into the film area inside the camera through the finder eyepiece lens 21 and a water resistant glass 13a.

Figure 2:
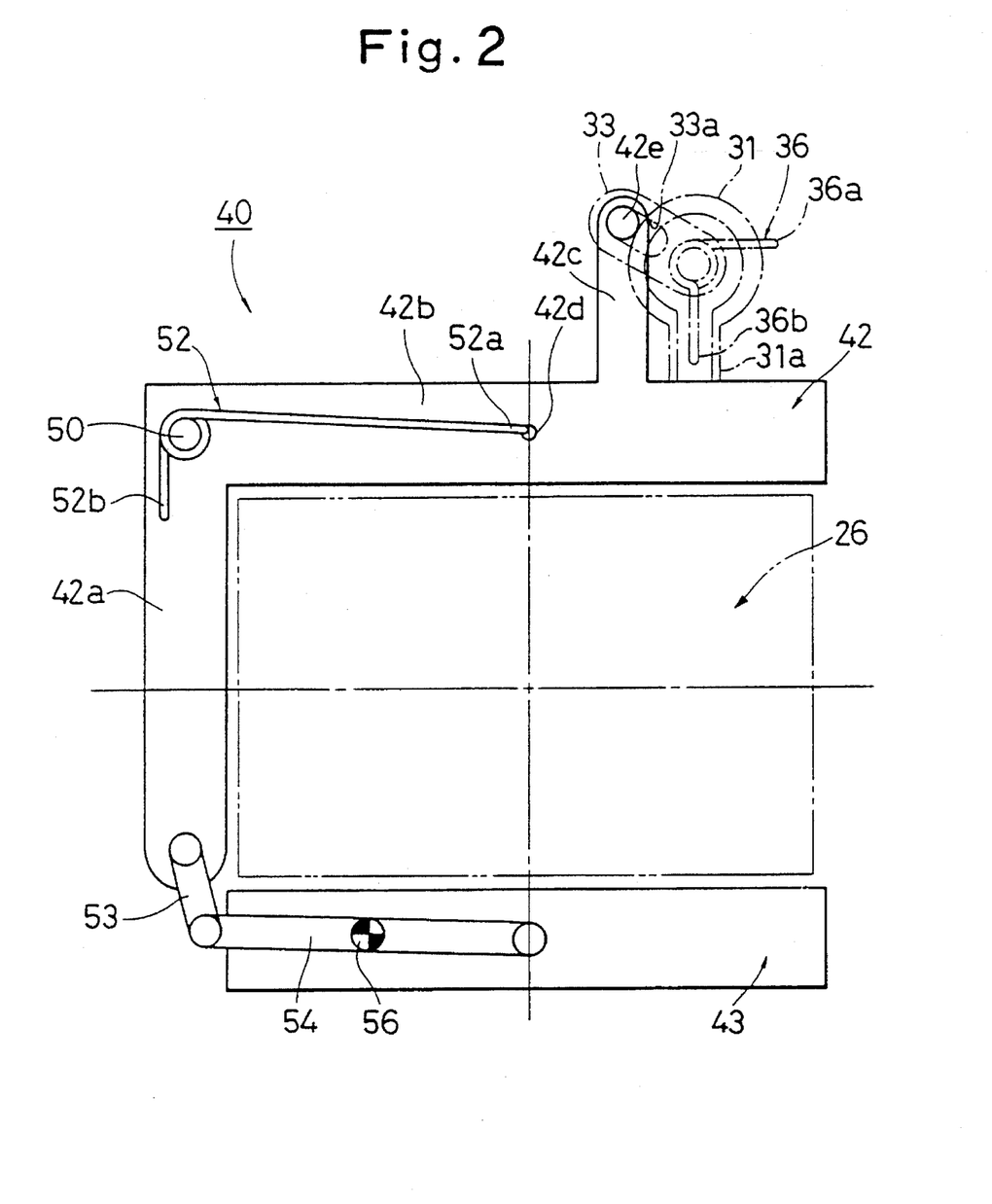
FIG. 2 is a front elevational view illustrating the image format altering mechanism of said camera.
Figure 3:
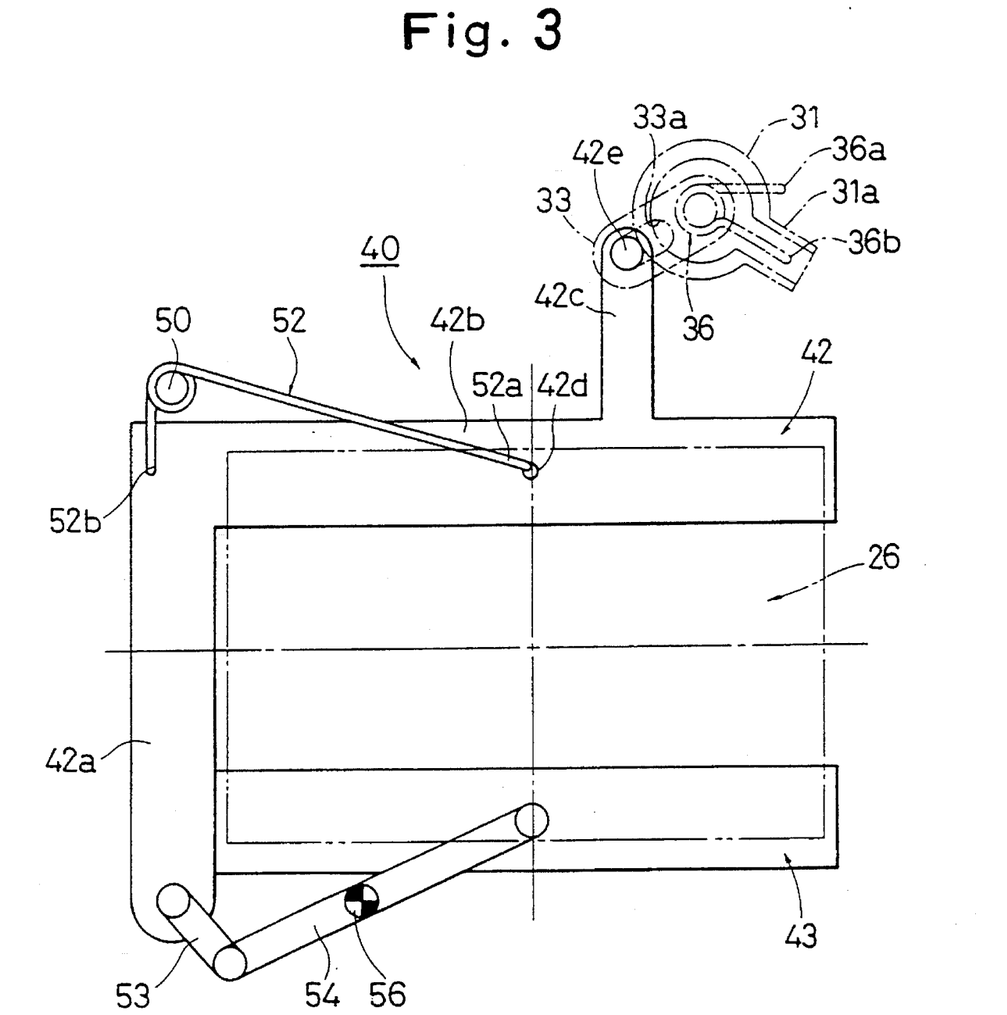
FIG. 3 is a front elevational view illustrating the image format altering mechanism in a different mode.

Further a rotating selection switch (i.e., image format selecting switch) 30 is fixed on the camera back 12. The selecting switch 30 is an operating member associated with the image format altering mechanism 40 (rf. FIG. 2 and FIG. 3) of the camera 10 for varying the image format between a large image format and a smaller, more oblong image format. The selecting switch 30 is connected with the image format altering mechanism 40 when the camera back 12 is closed.

The selecting switch 30 includes a rotating knob 31 fixed on the back (i.e., exterior) wall of the camera back 12, a click arm 32, switching arm 33 and a switching contact 34 made of a conductive material fixed on the front (i.e., internal) wall of the camera back 12. The rotating knob 31, the click arm 32, the switching arm 33 and the switching contact 34 are all inseparably affixed, at predetermined angles relative to one another, on a rotating shaft 35 which is rotatably affixed to the camera back 12. The rotating shaft 35 extends through the camera back 12 and is fitted with an 0-ring (not shown) in a water-tight arrangement. Accordingly, the click arm 32, switching arm 33 and switching contact 34 are rotated as a unit on the rotating shaft 35 when the rotating knob 31 is rotated by the photographer.

The rotating angle of the rotating knob 31 is limited to the angle defined between the positions of the rotating knob 31 at the large image format position (shown in FIG. 2) and the small, oblong image format position (shown in FIG. 3). The rotating knob 31 is constantly biased, by a torsion spring 36 affixed on the rotating shaft 35, in the clockwise direction (i.e., towards the large image format position shown in FIG. 2). The torsion spring 36 is anchored at one end 36a on the body or fixture (not shown) of the camera back 12. The other end 36b is fixed on an arm of the rotating knob, extending downward along the arm (FIG. 2).

Figure 1:
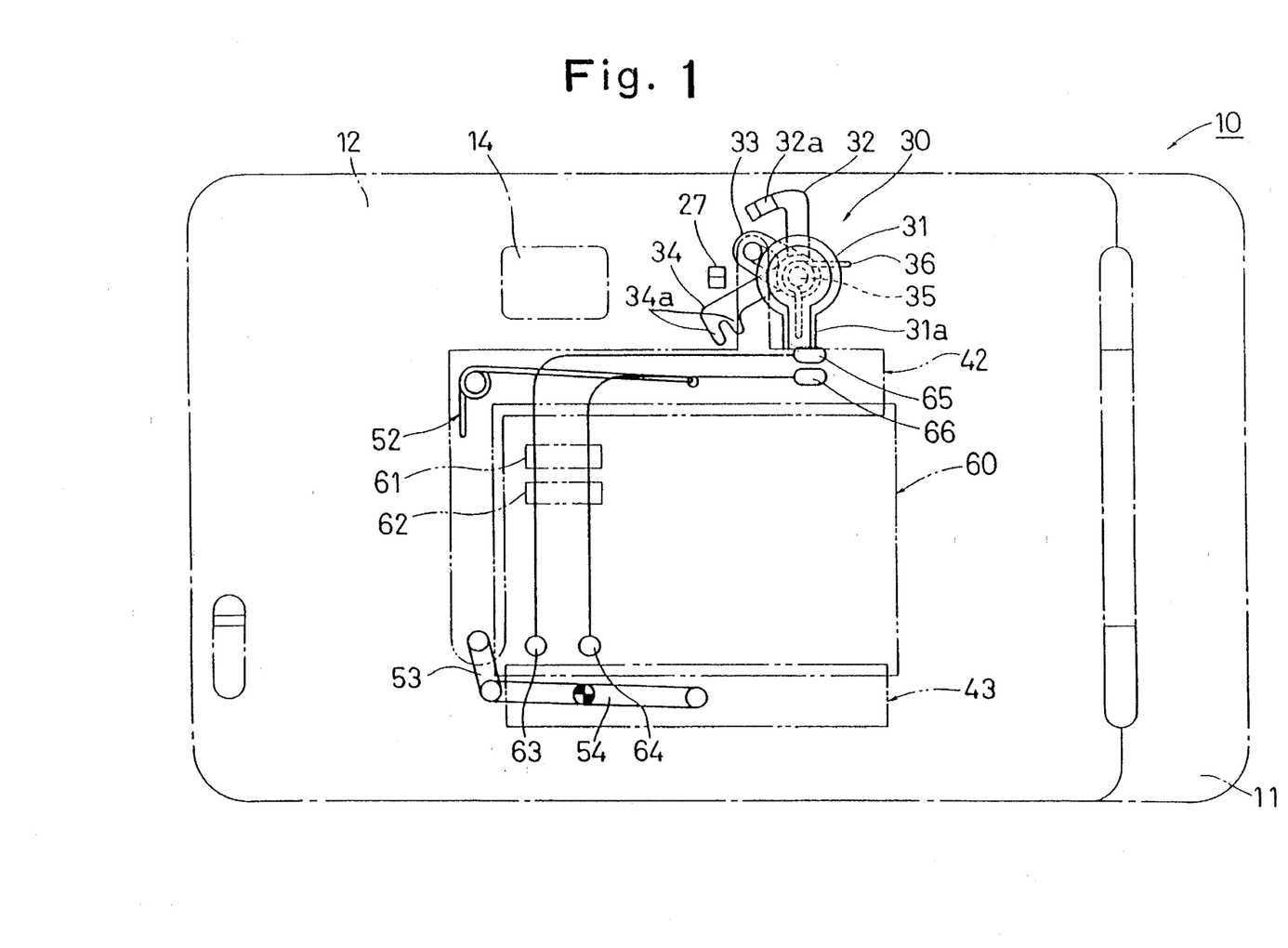
FIG. 1 is a back elevational view illustrating the main structure of the image format altering camera provided by this invention.
Figure 4:
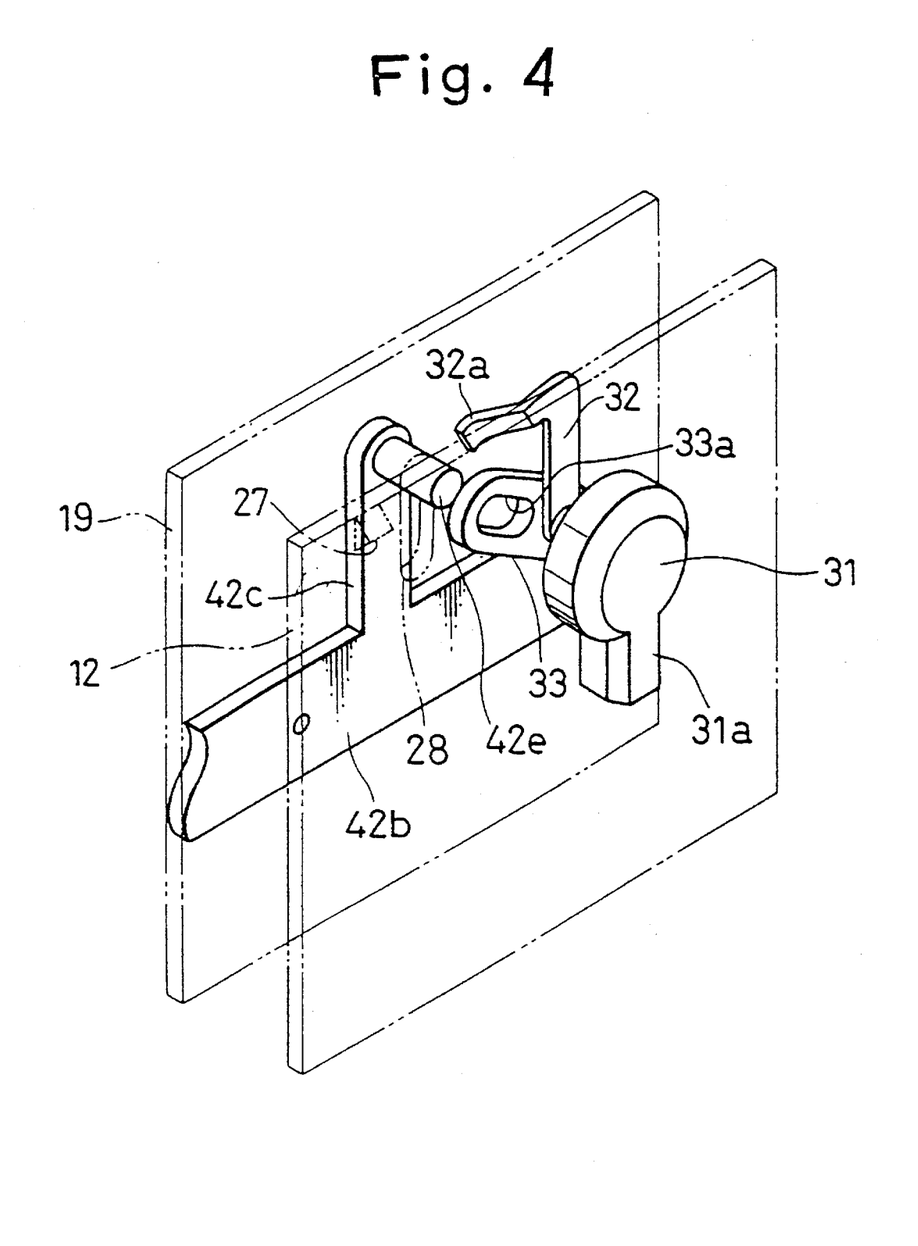
FIG. 4 is a perspective view of a section illustrating the relationship between the selecting switch and the image format altering mechanism.
Figure 5:
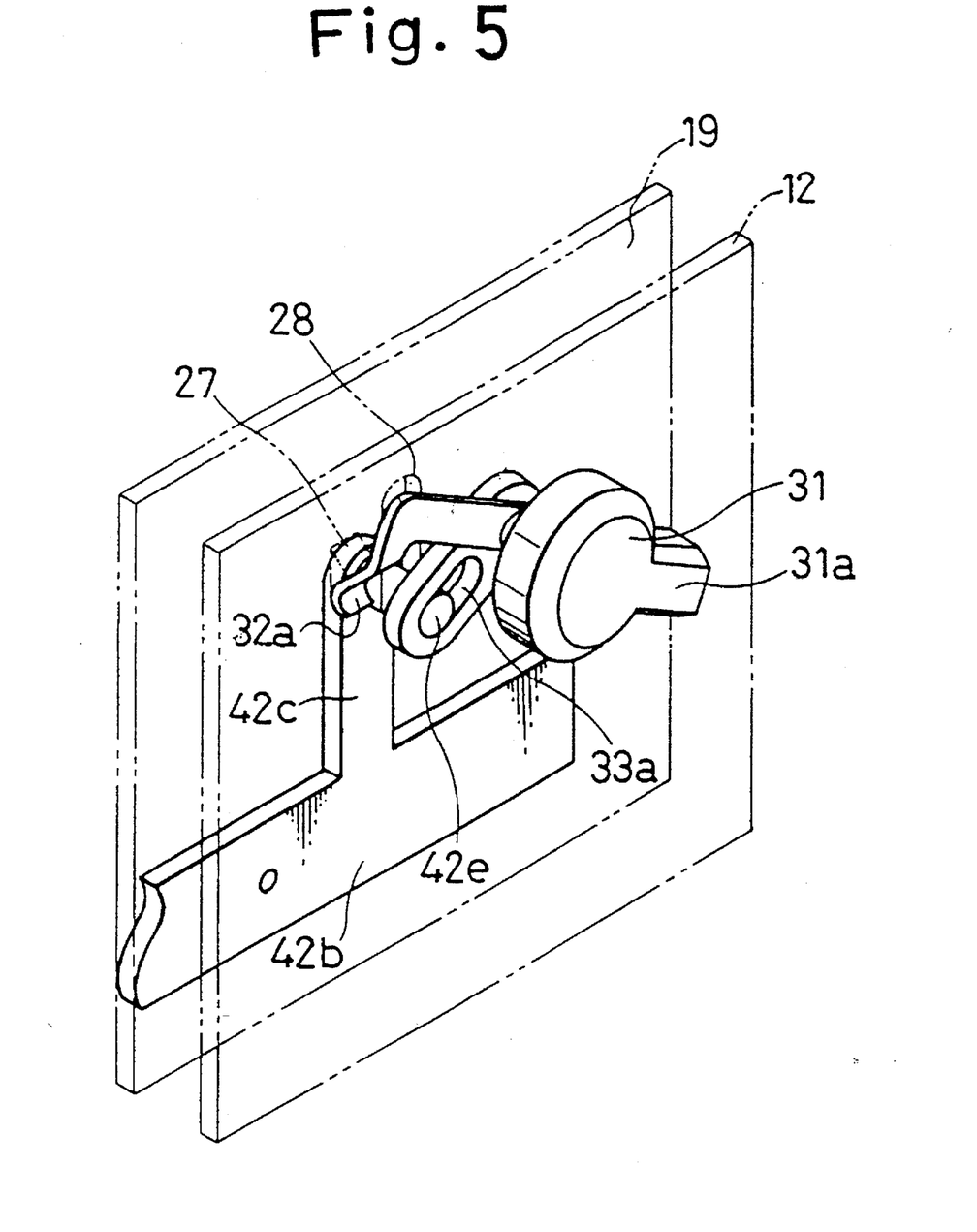
FIG. 5 is a perspective view of a section illustrating the relationship between the selecting switch and the image format altering mechanism in different mode.

The selecting switch 30 is structured in a manner such that it engages with the image format altering mechanism 40 via the connecting groove or slot 33a of the switching arm 33 and the connecting pin 42e of the image format altering mechanism 40 when the camera back is closed. FIG. 4 shows the spatial relationship between the connecting groove 33a and the connecting pin 42e prior to their engagement. If the rotating knob 31 is rotated towards the small image format position (i.e., counterclockwise direction in FIG. 4), provided that the connecting groove 33a is engaged with the connecting pin 42e or the camera back 12 is closed, the switching arm 33 pushes the connecting pin 42e down, and at the same time, the elastic connector tip 32a of the click arm 32 engages with the connecting point 27 formed at a specific position on the internal wall 19. The force required for the connector tip 32a to be disengaged with from the connecting point 27 by passing back over the same in the clockwise direction exceeds the combined connecting force of the torsion spring 36 and the torsion spring 52 ( rf. FIG. 1 and/or FIG. 3 ). Therefore, once the selecting switch 30 is turned to the small image format position, as shown in FIG. 3, the selecting switch 30 maintains the selected position, or the position of the small image format, until the camera back 12 is opened or the rotating knob 31 is manually operated to disengage the connector tip 32a from the connecting point 27.

FIGS. 2 and 3 show the image format altering mechanism 40 built into the camera 10. A film spool chamber 23 (FIG. 7) and a film magazine chamber 24 are provided on opposite sides of the camera body 11. A film aperture 26 exists between the film spool chamber 23 and the film magazine chamber 24 with specific image format dimensions determined by the aperture frame 25. The image format altering mechanism 40 is installed in the camera body 11 at a predetermined position with respect to the film aperture 26 has a first light buffer blade 42 and a second light buffer blade 43. The first light buffer blade 42 includes a vertically extended guide 42a, and a horizontally extended light buffer 42b which makes a right angle with the guide 42a. A connecting protrusion 42c extends upward from and forms a right angle with the light buffer 42b. The afore-mentioned connecting pin 42e is provided on the upper end of the connecting protrusion 42c and protrudes towards the back of the camera 10. The connecting pin 42e protrudes out through vertically elongated hole 28 formed in the internal wall 19 of the camera body.

The first light buffer blade 42 and second light buffer blade 43 are held by guide parts, (not shown in the drawings), in a manner such that they can move vertically with respect to the film aperture 26. Their moving ranges are limited to the large image format position shown in FIG. 2 and the small image format position shown in FIG. 3.

The first light buffer blade 42 and the second light buffer blade 43 are connected to each other by a short connecting bar 53 and a long connecting bar 54. One end of the short connecting bar 53 is connected with the lower end of the guide 42a by a pivot axis and the other end is connected with one end of the long connecting bar 54 by a pivot axis. The other end of the long connecting bar 54 is connected to the middle portion of the second light buffer blade 43 by a pivot axis. The middle of the long connecting bar is connected by a stationary pivot axis 56 fixed on the camera body 11 in a manner such that it is prevented from moving with respect to the camera body 11. By this related linkage of functional parts, the first light buffer blade 42 is moved downward from the position shown in FIG. 2, the long connecting bar 54 is turned counterclockwise via the short connecting bar 53 and the second light buffer blade 43 is driven upward, thereby bringing light buffer blades 42 and 43 to the small image format positions, as shown in FIG. 3. Also, by moving the first light buffer blade 42 upward from the position shown in FIG. 3, the long connecting bar 54 is turned clockwise via the short connecting bar 53 and the second light buffer blade 43 is driven downward, thereby bringing light buffer blades 42 and 43 to the large image format positions as shown in FIG. 2.

The first light buffer blade is connected to one end 52a of the torsion spring 52 at a hole 42d located in the middle of light buffer 42b. The torsion spring 52 is held by a stationary pin 50 fixed on a fixture (not shown in drawings) of the camera body. The first light buffer blade 42 is spring biased in the upward direction at all times by the torsion spring 52. In other words, both the first light buffer blade 42 and the second light buffer blade 43 are spring biased towards the retracting directions from the film aperture 26 (i.e., towards the large image format position) as shown in FIG. 2 by this torsion spring.

A data imprint module 60 is mounted on the camera back 12, or in between the film pressure plate 9 and the camera back 12. The data imprint module 60 is a mechanism for imprinting photographing data (e.g., photographing date) on a film. The data imprint module 60 includes a first light emitter 61 for imprinting photographing data in an upper part of the large image area and a second light emitter 62 for imprinting photographing data in an upper part of the small image area. The light emitters 61 and 62 face openings 9a and 9b formed on the film pressure plate 9.

The data imprint module 60 also includes a mechanism for activating either the first light emitter or the second light emitter, depending upon the selected image format in order to imprint photographing data in the proper part of the film. The data imprint module 60 further includes connecting terminals 63 and 64. The first light emitter is activated to emit light when the terminals 63 and 64 are not in connection, or in an electrically open state. The second light emitter is activated to emit the light when the terminals 63 and 64 are in connection, or in an electrically closed state.

The data imprint module 60 drives its quartz controlled clock (not shown in drawings) with a battery mounted on the camera back 12, and the light emitting trigger signals for the first and second light emitters 61 and 62 are supplied by the main battery (not shown) loaded in the camera body 11 via the connecting pins 70 (rf. FIG. 7) installed on the camera back 12 and the connecting terminals 71 (rf. FIG. 7) installed on the camera body 11 which contacts with the connecting pins 70 when the camera back is closed.

Figure 6:
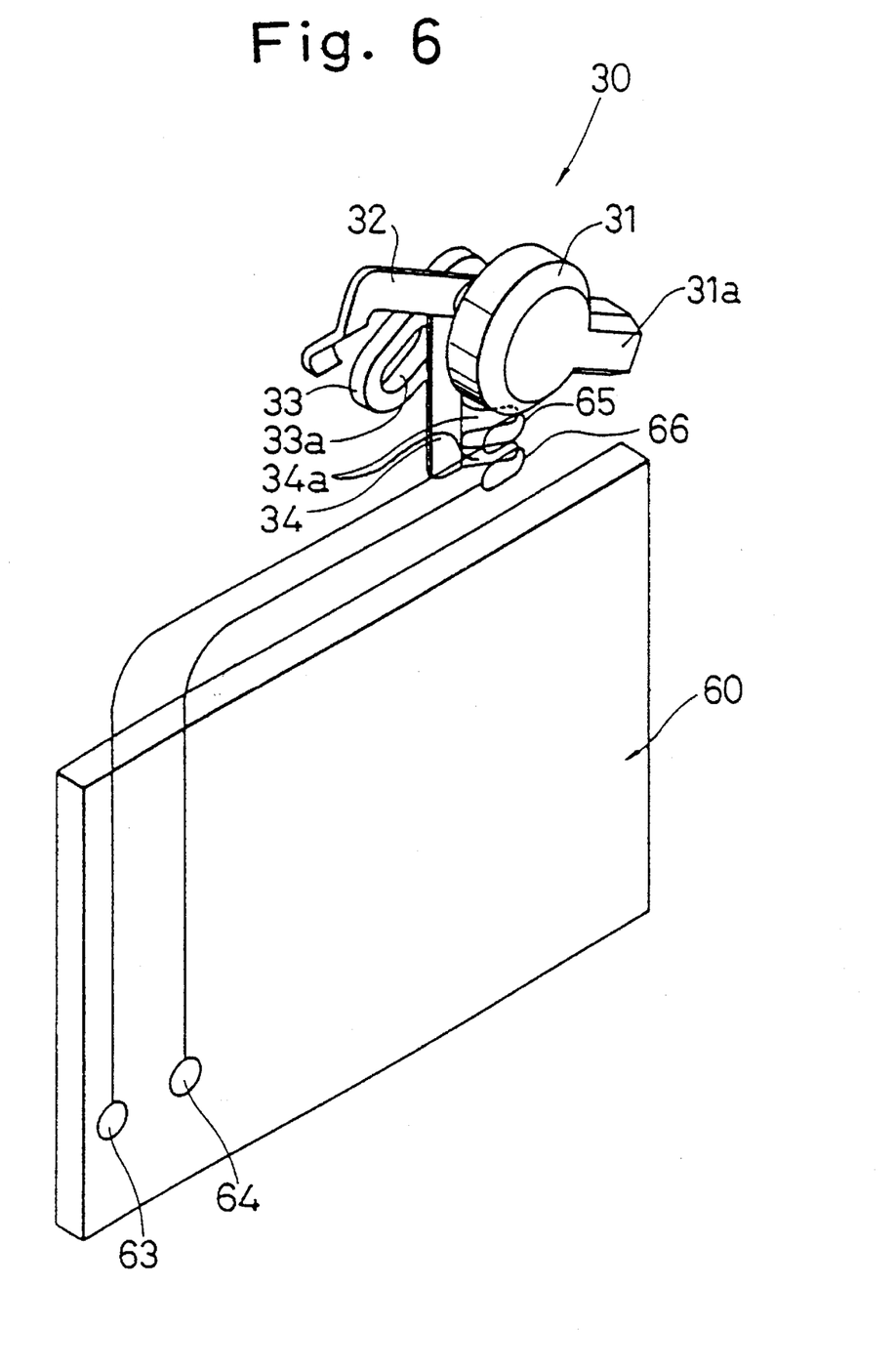
FIG. 6 is a perspective view of a section illustrating the relationship between the selecting switch and the data imprint module; and, FIG. 7 is a back perspective view of the image format altering camera provided by this invention with its camera back opened.

Lands 65 and 66, which are electrically connected with the terminals 63 and 64, are positioned near the selecting switch 30 on the inside wall of the camera back 12. Lands 65 and 66 come into contact with contact points 34a of the switching contact 34 when the rotating knob 31 is turned to the small image format position, as shown in FIG. 3. If the rotating knob 31 is turned to the large image format position, as shown in FIG. 2, the contact points 34a do not come into contact with lands 65 and 66 (i.e., comes into an electrically open state). FIG. 6 shows the contact points 34a in contact with both lands 65 and 66. Thus, connection or disconnection of lands 65 and 66 accomplishes the opening or closing of the terminals 63 and 64. In other words, the lands 65 and 66 and the switching contact 34 serve to electrically open or close the terminals 63 and 64, and make up a selecting switch for selecting either the first or second light emitter depending on which image format is chosen. Pins 70 are connected to terminals 63 and 64, which are in turn connected to lands 65 and 66 which, as noted above, can be selectively connected via contact points 34a.

The camera having the image format selecting mechanism may be operated in the following manner. The image format altering mechanism 40 and the selecting switch 30 are always biased into the large image format position by the torsion springs 36 and 52 when the camera back is open. When the camera back is closed, the connecting groove 33a of the switching arm 33 couples with the connecting pins 42e. In this state, the image format altering mechanism 40 is set on the large image format position shown in FIG. 2, and the first light emitter 61 is in the light emitting state due to the lands of the data imprint module 60 not being connected with the contact points 34a of the switching contact 34. Accordingly, the camera 10 is set on the large image format mode. If the rotating knob 31 is turned to the small image format position, as shown in FIG. 3, the connecting protrusion 42c is pushed downward via the connecting groove 33a following the movement of the switching arm 33. The image format altering mechanism 40 is switched to the small image format position, and the second light emitter of the data imprint module is switched to the light emitting mode by the contact between the lands 65 and 66 of the data imprint module and the contact points of the switching contact. At this points the small image format mode has been selected. To select the large image format for a standard size picture, the rotating knob 31 must be turned to the large image format position shown in FIG. 2.

Once the camera back 12 is opened, even when the small image format has been selected with the camera back 12 closed, the selecting switch 30 is driven to the large image format position by the force of the torsion spring 36. The image format altering mechanism 40 is also driven to the large image format position by the force of the torsion spring 52. By this movement, the selecting switch 30 and the image format altering mechanism are adjusted to the same image format mode when the camera back is open.

The image format selecting structure does not require additional contact pins and contact terminals on the camera back 12 and the camera body 11 since the selecting switch of the first and second light emitters is installed on the camera back and the selecting switch of the light emitters is linked with the selecting switch 30. In other words, the selecting switch 30 is composed of the switching contact 34 and the lands 65 and 66.

We claim:

1. A camera having an image format altering means that includes at least one light buffer blade which is arranged to be inserted into and retracted from an aperture of the camera to thereby determine a picture image area, a large image format and a small image format being selected by retracting and inserting the light buffer blade from and into the aperture, respectively, comprising:

a camera back hinged to a body of the camera so as to be opened and closed;

an image format selecting member provided on said camera back to move said light buffer blade, said image format selecting member being movable between a position corresponding to a retracted position of the light buffer blade and a position corresponding to an inserted position of the light buffer blade;

a buffer blade biasing member for biasing said light buffer blade towards one of said retracted position and said inserted position so that said light buffer blade is located at said retracted position or at said inserted position when said camera back is opened, regardless of the position of said light buffer blade before said camera back is opened; and a selecting member biasing member for biasing said image format selecting member towards a linkable position at which said image format selecting member links with the image format altering means, independent of said buffer blade biasing member, so that the image format altering means and said image format selecting member are linked with each other when said camera back is closed.

2. The camera of claim 1, said buffer blade biasing member biasing the light buffer blade towards said retracted position, and said selecting member biasing member biasing said image format selecting member towards said position corresponding to said retracted position of the light buffer blade.

3. The camera of claim 1, said image format selecting member comprising:

a rotating knob protruding from an external wall of said camera back;

a click arm for elastically engaging with a connector provided on a wall of said camera body so as to keep said rotating knob at said position corresponding to said inserted position of the light buffer blade; and a switching arm for engaging with the image format altering means.

4. The camera of claim 3, said click arm and said switching arm being rotated as a unit when said rotating knob is rotated.

5. The camera of claim 4, further comprising a connecting pin provided on the image format altering means, and a connecting groove provided on said switching arm, said connecting pin being inserted into said connecting groove for connecting the image format altering means with said switching arm when said camera back is closed.

6. The camera of claim 5, said image format selecting member maintaining said inserted position of said light buffer blade until said camera back is opened against the biasing forces of said buffer blade biasing member and said selecting member biasing member, or until said rotating knob is manually operated to disengage said click arm from said connector.

7. A camera having an image format altering means that includes at least one light buffer blade which is arranged to be inserted into and retracted from an aperture of the camera to thereby determine a picture image area, a large image format and a small image format being selected by retracting and inserting the light buffer blade from and into the aperture, respectively, comprising:

a camera back hinged to a body of the camera so as to be opened and closed;

an image format selecting member provided on said camera back to move said light buffer blade, said image format selecting member being linked with said image format altering means when said camera back is closed;

first light emitting means of first data imprinting means mounted on said camera back for imprinting photographing related data at an upper portion of a large image area;

second light emitting means of second data imprinting means mounted on said camera back for imprinting photographing related data at a an upper portion of a small image area; and, a selecting switch for selecting one of said first and second light emitting means in accordance with an image format selection by said image format selecting member.

8. The camera of claim 7, said image format selecting member comprising:

a rotating knob protruding from an external wall of said camera back;

a click arm for elastically engaging with a connector provided on a wall of said camera body so as to keep said rotating knob at said position corresponding to said inserted position of the light buffer blade;

a switching arm for engaging with the image format altering means; and a switching contact arm made of a conductive material.

9. The camera of claim 7, further comprising:

a data imprint module for activating either said first or said second light emitting means, said data imprint module including first and second terminals, and said first light emitting means of said first data imprinting means being activated when said first and second terminals are not connected, and said second light emitting means of said second data imprinting means being activated when said first and second terminals are connected; and first and second lands electrically connected with said first and second terminals.

10. The camera of claim 9, said first and second terminals being selectively connected by said switching contact arm.

11. The camera of claim 7, further comprising:

a buffer blade biasing member for biasing the light buffer blade towards one of said retracted position and said inserted position so that the light buffer blade is located at one of said retracted position or at said inserted position when said camera back is opened, regardless of the position of the light buffer blade before said camera back is opened; and, a selecting member biasing member for biasing said image format selecting member towards a linkable position at which said image format selecting member links with the image format altering means, independently of said buffer blade biasing member, so that the image format altering means and said image format selecting member are linked with each other when said camera back is closed.

12. The camera of claim 1, further comprising water-resistant camera structure.

13. The camera of claim 7, further comprising water-resistant camera structure.

14. A camera having image format altering means including at least one light buffer blade arranged for insertion into and retraction from an aperture of the camera to thereby determine a picture image area, large and small image area formats being selected by retraction and insertion of said at least one light buffer blade from and into the aperture, said camera comprising:

a camera back hingedly mounted to a camera body for opening and closing the camera body;

image format selecting means provided on the camera back for moving the at least one light buffer blade, said image format selecting means being coupled with the image format altering means when said camera back is closed;

first data imprinting means mounted on said camera back for imprinting photographing related data at an upper portion of a large image area, said first data imprinting means comprising first light emitting means for emitting light;

second data imprinting means mounted on said camera back for imprinting photographing related data at an upper portion of a small image area, said second data imprinting means comprising second light emitting means for emitting light; and light emitting selecting means for selecting one of said first light emitting means and said second light emitting means, in association with an image format selection by said image format selecting means, said light emitting selecting means and said image format selecting means comprising a single member.

15. The camera according to claim 14, said image format selecting means comprising:

a rotating knob protruding from an external wall of said camera back;

a click arm for elastically engaging with an element provided on a wall of the camera body so as to maintain said rotating knob at a position corresponding to an inserted position of the at least one light buffer blade;

a switching arm for engaging with the image format altering means; and a switching contact arm formed of a conductive material.

16. The camera according to claim 14, further comprising:

a data imprint module for activating either said first light emitting means or said second light emitting means, said data imprint module including first and second terminals, said first light emitting means being activated when said first and second terminals are not connected and said second light emitting means being activated when said first and second terminals are connected; and first and second lands electrically connected with said first and second terminals.

17. The camera according to claim 16, said switching contact arm selectively connecting said first and second terminals.

18. The camera according to claim 14, further comprising:

buffer blade biasing means for biasing the at least one light buffer blade towards one of the retracted position and the inserted position so that the at least one light buffer blade is located in the retracted position or in the inserted position when said camera back is opened, regardless of a position of the at least one light buffer blade before said camera back is opened; and biasing means for biasing said image format selecting means towards a position at which said image format selecting means links with the image format altering means, independently of said buffer blade biasing member, whereby the image format altering means and said image format selecting means are linked to each other when said camera back is closed.

19. The camera according to claim 14, further comprising means for rendering said camera water-resistant.

* * * * *